United States Patent
Lee et al.

(10) Patent No.: US 11,245,495 B2
(45) Date of Patent: Feb. 8, 2022

(54) METHOD FOR HARQ-ACK/NACK FEEDBACK IN WIRELESS COMMUNICATION SYSTEM AND DEVICE THEREFOR

(71) Applicant: LG Electronics Inc., Seoul (KR)

(72) Inventors: Hyunho Lee, Seoul (KR); Daesung Hwang, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 83 days.

(21) Appl. No.: 16/624,228

(22) PCT Filed: Jun. 19, 2018

(86) PCT No.: PCT/KR2018/006882
§ 371 (c)(1),
(2) Date: Dec. 18, 2019

(87) PCT Pub. No.: WO2018/236117
PCT Pub. Date: Dec. 27, 2018

(65) Prior Publication Data
US 2020/0136763 A1 Apr. 30, 2020

Related U.S. Application Data

(60) Provisional application No. 62/522,011, filed on Jun. 19, 2017, provisional application No. 62/622,963, filed on Jan. 28, 2018.

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1664* (2013.01); *H04L 5/0007* (2013.01);
(Continued)

(58) Field of Classification Search
None
See application file for complete search history.

(56) References Cited

U.S. PATENT DOCUMENTS 9,112,691 B2   8/2015   Eshan et al.
9,661,655 B2   5/2017   Zeira et al.
(Continued)

FOREIGN PATENT DOCUMENTS

KR   101427868 B1   9/2014
WO   2011127100 A1   10/2011

*Primary Examiner* — Andrew C Oh
(74) *Attorney, Agent, or Firm* — Dentons US LLP

(57) ABSTRACT

A method for hybrid automatic repeat request-acknowledgment/negative-acknowledgment (HARQ-ACK/NACK) feedback in a wireless communication system, according to one embodiment of the present disclosure, is performed by a terminal and may comprise the steps of: determining an uplink resource for transmitting a NACK if the NACK must be transmitted as HARQ-ACK/NACK feedback for a downlink signal; determining whether to transmit, along with the NACK, a channel quality indicator (CQI) associated with the downlink signal corresponding to the NACK; and if it is determined to transmit the CQI along with the NACK, transmitting the NACK and the CQI on the determined uplink resource.

10 Claims, 9 Drawing Sheets

(51) Int. Cl.
*H04L 5/00* (2006.01)
*H04W 28/04* (2009.01)
*H04W 72/04* (2009.01)

(52) U.S. Cl.
CPC .......... *H04L 5/0055* (2013.01); *H04L 5/0057* (2013.01); *H04L 5/0094* (2013.01); *H04W 28/04* (2013.01); *H04W 72/042* (2013.01); *H04W 72/044* (2013.01)

(56) References Cited

U.S. PATENT DOCUMENTS

| | | | |
|---|---|---|---|
| 2007/0097981 A1* | 5/2007 | Papasakellariou | H04L 5/0057 370/394 |
| 2007/0171849 A1* | 7/2007 | Zhang | H04L 5/0091 370/310 |
| 2009/0232101 A1* | 9/2009 | Papasakellariou | H04W 52/48 370/335 |
| 2010/0110878 A1* | 5/2010 | Frederiksen | H04L 1/1692 370/216 |
| 2010/0124291 A1* | 5/2010 | Muharemovic | H04L 1/1671 375/260 |
| 2010/0232311 A1* | 9/2010 | Zhang | H04L 5/0053 370/252 |
| 2010/0238975 A1* | 9/2010 | Nakao | H04L 1/1607 375/130 |
| 2011/0136495 A1* | 6/2011 | Chen | H04L 5/0055 455/450 |
| 2012/0039176 A1* | 2/2012 | Eshan | H04L 47/14 370/237 |
| 2012/0176922 A1* | 7/2012 | Ehasan | H04L 1/0017 370/252 |
| 2012/0213163 A1 | 8/2012 | Lee et al. | |
| 2013/0034073 A1* | 2/2013 | Aiba | H04L 1/1887 370/329 |
| 2013/0208710 A1* | 8/2013 | Seo | H04W 52/346 370/336 |
| 2014/0247800 A1* | 9/2014 | Ro | H04W 24/08 370/329 |
| 2015/0049699 A1* | 2/2015 | Takeda | H04W 76/15 370/329 |
| 2015/0055723 A1* | 2/2015 | Kim | H04B 7/024 375/267 |
| 2015/0071267 A1* | 3/2015 | Wu | H04W 52/50 370/336 |
| 2015/0139125 A1* | 5/2015 | Bharadwaj | H04L 5/0055 370/329 |
| 2016/0211948 A1* | 7/2016 | Tiirola | H04L 1/1671 |
| 2017/0064694 A1* | 3/2017 | Wang | H04B 7/0632 |
| 2018/0123755 A1* | 5/2018 | Kim | H04L 5/005 |
| 2018/0139773 A1* | 5/2018 | Ma | H04L 5/0007 |
| 2018/0242280 A1* | 8/2018 | Axmon | H04L 41/0823 |
| 2018/0278365 A1* | 9/2018 | Liu | H04L 1/1893 |
| 2019/0140774 A1* | 5/2019 | Noh | H03M 13/09 |
| 2019/0238242 A1* | 8/2019 | Middleton | H04L 1/00 |
| 2019/0312696 A1* | 10/2019 | Kim | H04B 7/0626 |
| 2020/0304257 A1* | 9/2020 | Kim | H04W 72/048 |

* cited by examiner

FIG. 7
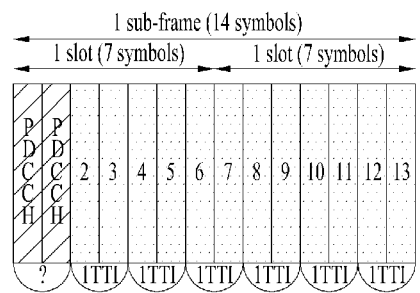
(a) 2 symbol TTI DL structure
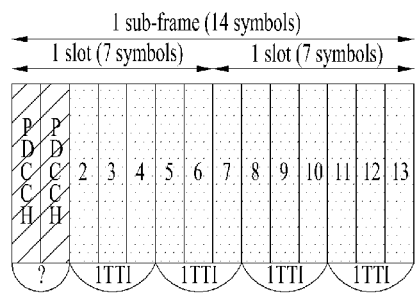
(b) 3 symbol TTI DL structure
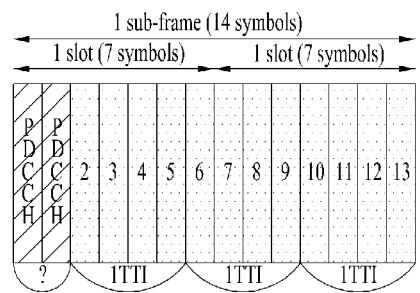
(c) 4 symbol TTI DL structure
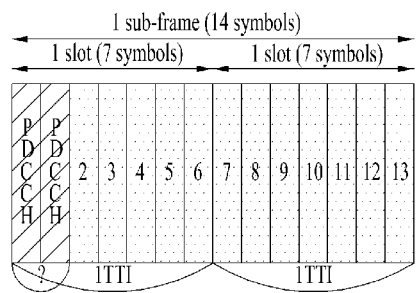
(d) 7 symbol TTI DL structure

METHOD FOR HARQ-ACK/NACK FEEDBACK IN WIRELESS COMMUNICATION SYSTEM AND DEVICE THEREFOR

This application is the National Stage filing under 35 U.S.C. 371 of International Application No. PCT/KR2018/006882, filed on Jun. 19, 2018, which claims the benefit of U.S. Provisional Application Nos. 62/522,011, filed on Jun. 19, 2017 and 62/622,963, filed on Jan. 28, 2018, the contents of which are all hereby incorporated by reference herein in their entirety.

TECHNICAL FIELD

The present disclosure relates to a wireless communication system, and more particularly, to a hybrid automatic repeat request-acknowledgment/negative-acknowledgment (HARQ-ACK/NACK) feedback method for a terminal and device therefor.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure is directed to a HARQ-ACK/NACK feedback method in a wireless communication system supporting such latency reduction

DISCLOSURE

Technical Problem

The object of the present disclosure is to provide a method for HARQ-ACK/NACK feedback in a wireless communication system and operation therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method for HARQ-ACK/NACK feedback in a wireless communication system, which is performed by a user equipment (UE). The method may include: when a NACK needs to be transmitted as HARQ-ACK/NACK feedback for a downlink signal, determining an uplink resource for transmitting the NACK; determining whether to transmit a channel quality indicator (CQI), which is related to the downlink signal corresponding to the NACK, together with the NACK; and when it is determined that the NACK and the CQI are transmitted together, transmitting the NACK and the CQI on the determined uplink resource.

Additionally or alternatively, the uplink resource may be determined as an uplink resource indicated by a specific field of downlink control information related to the downlink signal among a predetermined number of uplink resources.

Additionally or alternatively, the uplink resource may be determined as an uplink resource corresponding to the CQI among a preconfigured uplink resource for a HARQ-ACK and a predetermined number of uplink resources separately configured for the NACK transmission.

Additionally or alternatively, when multiple downlink carriers are configured for the UE and there is a downlink carrier for which a NACK needs to be transmitted, the method may further include transmitting a CQI for a downlink subcarrier corresponding to a predetermined target service, quality of service (QoS), block error rate (BLER) requirement, and/or latency requirement.

Additionally or alternatively, whether the CQI related to the downlink signal corresponding to the NACK is transmitted together with the NACK may be determined depending on whether the downlink signal corresponding to the NACK corresponds to a predetermined target service, QoS, BLER requirement, and/or latency requirement or based on a scrambling identifier or format of downlink control information scheduling the downlink signal.

Additionally or alternatively, a HARQ codebook size for the downlink signal corresponding to the NACK may be determined as a sum of a bit number for the HARQ-ACK/NACK and a bit number of the CQI.

In another aspect of the present disclosure, provided herein is a UE for transmitting HARQ-ACK/NACK feedback in a wireless communication system. The UE may include a receiver; a transmitter; and a processor configured to control the receiver and the transmitter. The processor may be configured to: when a NACK needs to be transmitted as HARQ-ACK/NACK feedback for a downlink signal, determine an uplink resource for transmitting the NACK; determine whether to transmit a CQI, which is related to the downlink signal corresponding to the NACK, together with the NACK; and when it is determined that the NACK and the CQI are transmitted together, transmit the NACK and the CQI on the determined uplink resource.

Additionally or alternatively, the uplink resource may be determined as an uplink resource indicated by a specific field of downlink control information related to the downlink signal among a predetermined number of uplink resources.

Additionally or alternatively, the uplink resource may be determined as an uplink resource corresponding to the CQI among a preconfigured uplink resource for a HARQ-ACK and a predetermined number of uplink resources separately configured for the NACK transmission.

Additionally or alternatively, when multiple downlink carriers are configured for the UE and there is a downlink carrier for which a NACK needs to be transmitted, the processor may be configured to transmit a CQI for a downlink subcarrier corresponding to a predetermined target service, QoS, BLER requirement, and/or latency requirement.

Additionally or alternatively, whether the CQI related to the downlink signal corresponding to the NACK is transmitted together with the NACK may be determined depending on whether the downlink signal corresponding to the NACK corresponds to a predetermined target service, QoS, BLER requirement, and/or latency requirement or based on a scrambling identifier or format of downlink control information scheduling the downlink signal.

Additionally or alternatively, a HARQ codebook size for the downlink signal corresponding to the NACK may be determined as a sum of a bit number for the HARQ-ACK/NACK and a bit number of the CQI.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the present disclosure, HARQ-ACK/NACK feedback may be efficiently provided in a wireless communication system.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 7 illustrates the structures of DL subframes including short TTIs of multiple lengths (various numbers of symbols).

BEST MODE

Figure 1:
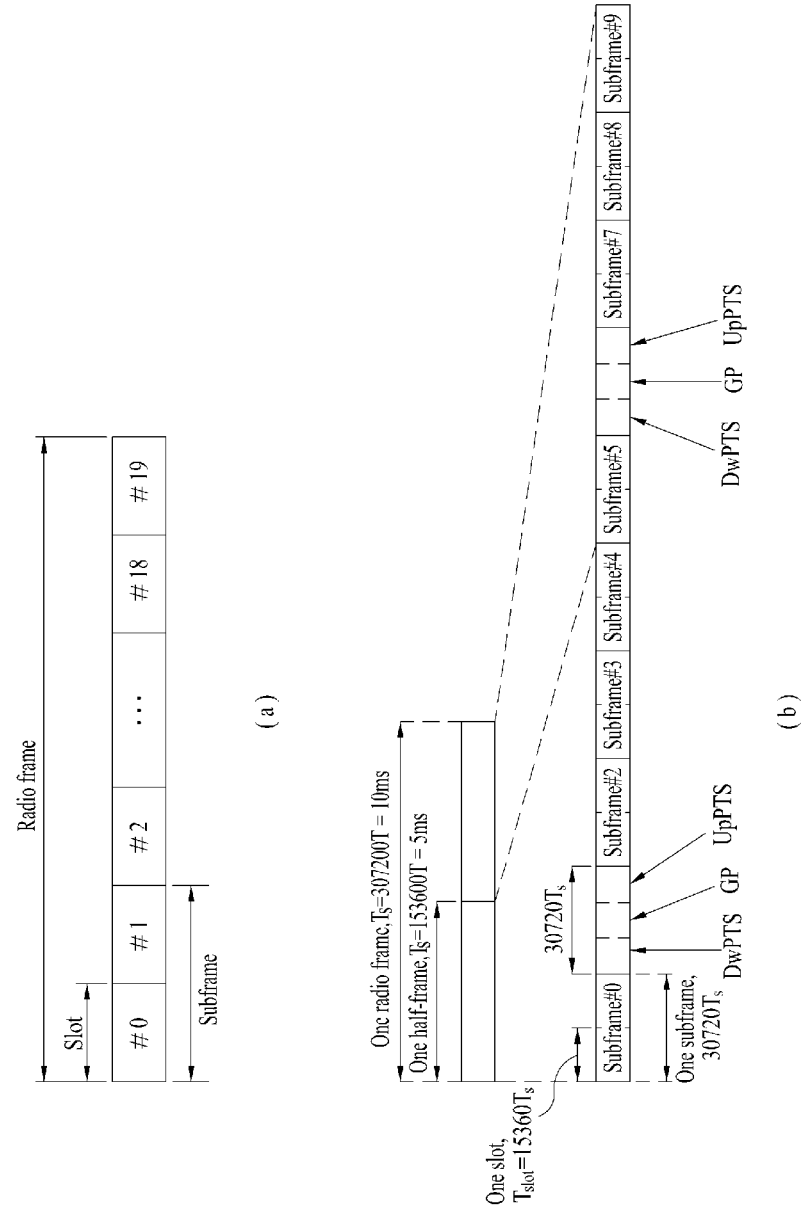
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot Time Slot), GP (Guard Period), and UpPTS (Uplink Pilot Time Slot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
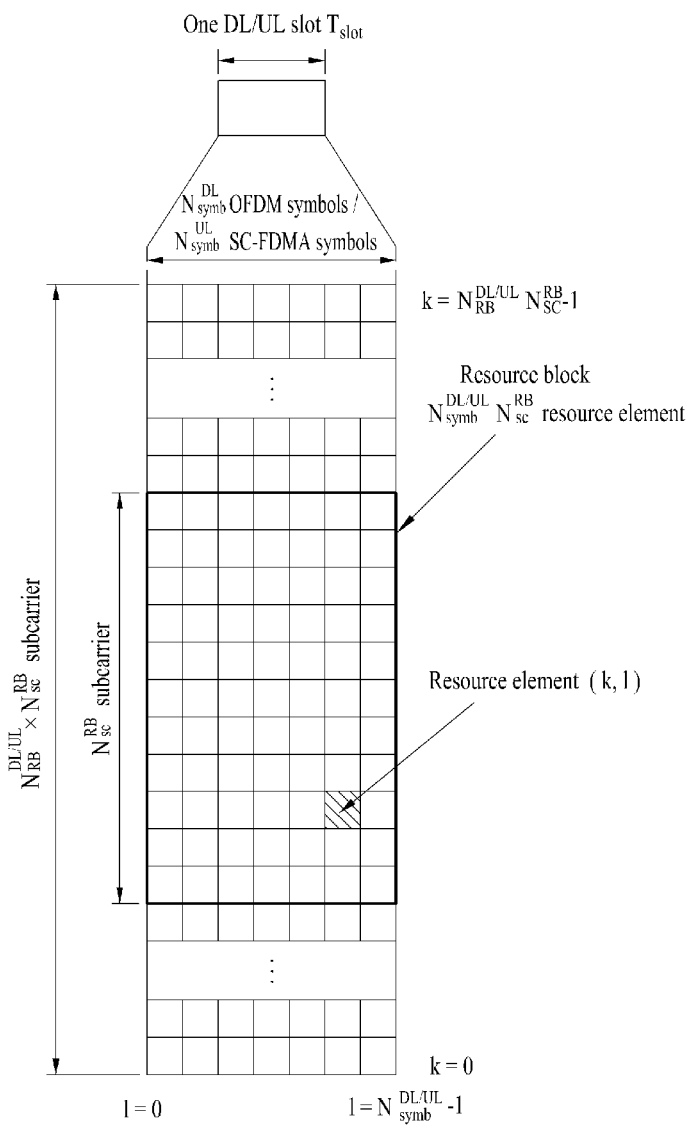
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{RB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
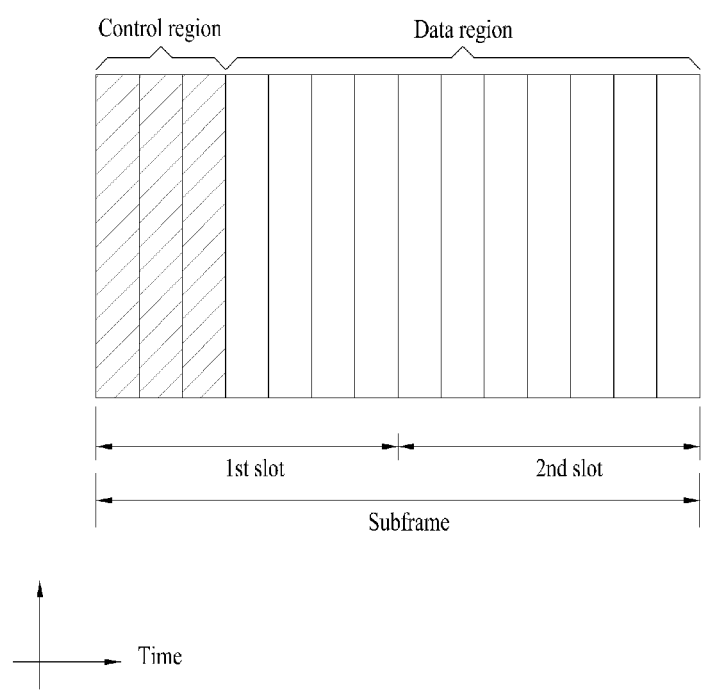
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four)

OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space, and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
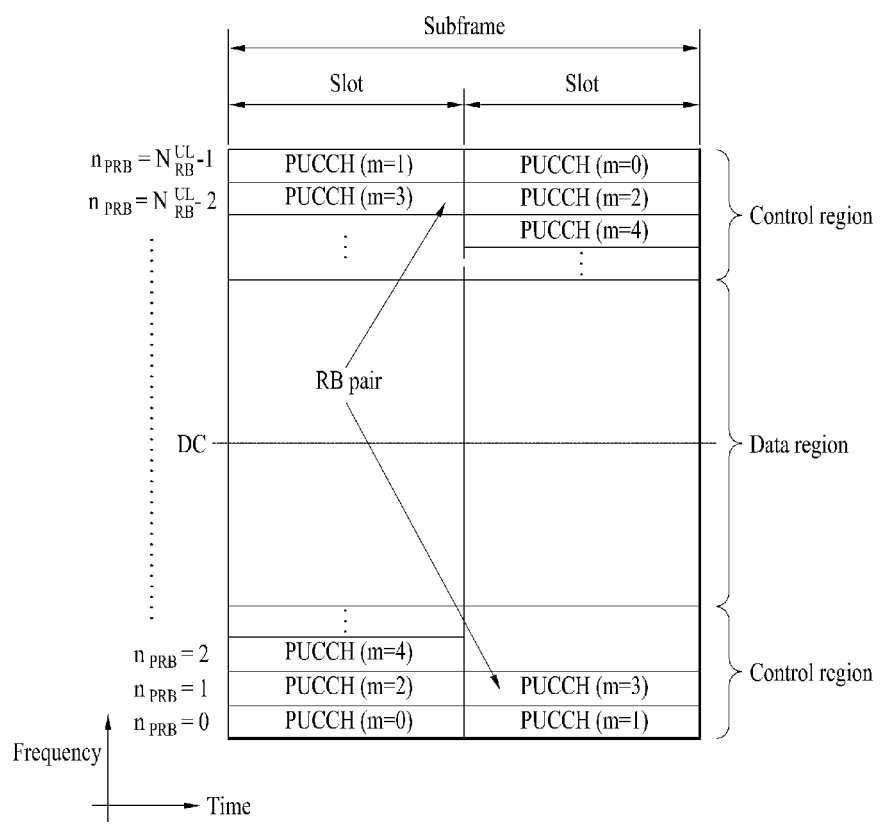
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

Meanwhile, in the LTE-A system expected to include finer MU-MIMO and explicit CoMP operations, current CSI feedback is defined in LTE and cannot sufficiently support such operations to be newly employed. As the requirements for CSI feedback accuracy become complicated to obtain sufficient MU-MIMO or CoMP throughput gain, they agreed to configure PMI with two types of long term/wideband PMI ($W_1$) and short term/ subband PMI ($W_2$). So to speak, final PMI is expressed as a function of $W_1$ and $W_2$. For example, final PMI W may be defined as follows: $W=W_1*W_2$ or $W=W_2*W_1$. Hence, in LTE-A, CSI shall be configured with RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH After Receiving a CSI Transmission Request Control Signal (A CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | Mode 2-0 RI (only for Open- | | Mode 2-2 RI |

TABLE 6-continued

| | PMI Feedback Type | | |
|---|---|---|---|
| | No PMI | Single PMI | Multiple PMIs |
| | loop SM) 1st wideband CQI(4 bit) + Best-M CQI(2 bit) (Best-M CQI: An average CQI for M SBs selected from among N SBs) Best-M index (L bit) | | 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CRI (CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

In a next-generation system, various (lengths of) transmission time intervals (TTIs) may be configured for all or specific physical channels to satisfy the requirements of various application fields. In particular, a TTI in which a physical channel such as a PDCCH/PDSCH/PUSCH/PUCCH is transmitted may be set less than 1 msec to reduce communication latency between an eNB and a UE depending on scenarios (the PDCCH/PDSCH/PUSCH/PUCCH is referred to as a sPDCCH/sPDSCH/sPUSCH/sPUCCH). For a single or multiple UEs, a plurality of physical channels may be present in one subframe (e.g., 1 msec), and each channel may have a different TTI (length). The following embodiments will be described based on the LTE system for convenience of description. In this case, a TTI may be set to 1 msec, which is the length of a normal subframe of the LTE system (such a TTI is referred to as a normal TTI). A short TTI means a TTI shorter than the normal TTI and includes one or multiple OFDM or SC-FDMA symbols. Although the present disclosure assumes the short TTI (i.e., a TTI shorter than one subframe) for convenience of description, the present disclosure may be extended and applied when the TTI is longer than one subframe or has a length equal to or longer than 1 ms. The present disclosure may also be extended and applied when the next-generation system introduces the short TTI by increasing the subcarrier spacing. Although the present disclosure is described based on the LTE system for convenience of description, the disclosure is also applicable to a technology that uses a different waveform/frame structure such as new radio access technology (RAT). In general, the present disclosure assumes the use of a sTTI (<1 msec), a long TTI (=1 msec), and a longer TTI (>1 msec). Although the following embodiments are described based on multiple UL channels having different TTI lengths, numerologies, and/or processing times, it is apparent that the embodiments are applicable to multiple UL/DL channels with different service requirements, latency, and/or scheduling units.

Figure 5:
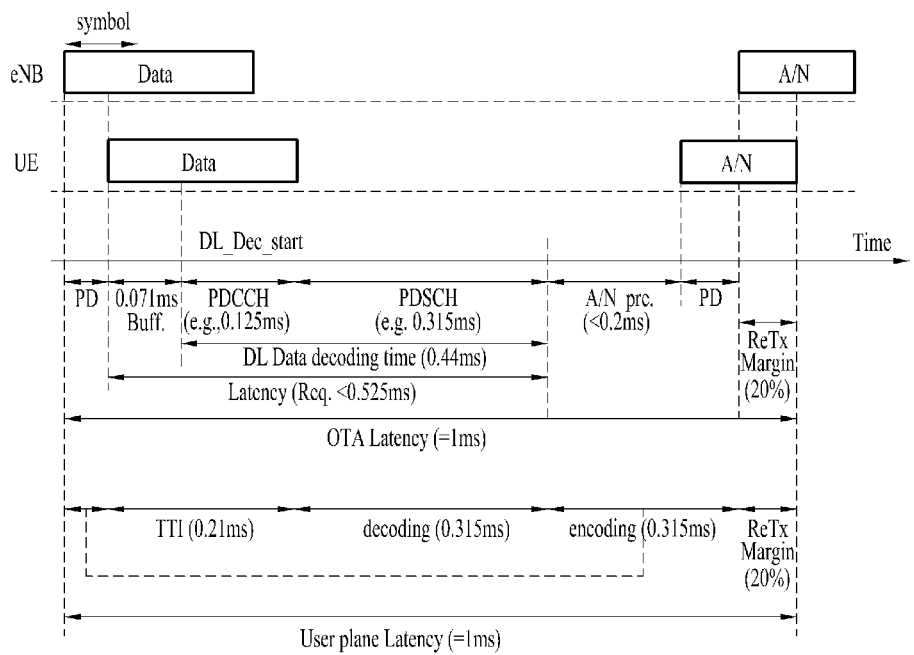
FIG. 5 illustrates a decrease in the length of a TTI according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
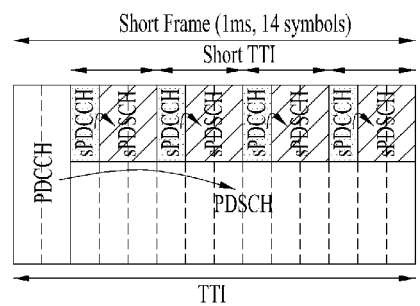
FIG. 6 illustrates an example of configuring a plurality of short TTIs in one subframe.

In a DL environment, a PDCCH for data transmission/scheduling within the sTTI (i.e., a sPDCCH) and a PDSCH for transmitting data within the sTTI (i.e., a sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting a sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In a UL environment, data may be transmitted/scheduled in the sTTI as in the DL case. In this case, channels corresponding to the PUCCH and the PUSCH, which are based on the normal TTI, may be referred to as 'sPUCCH' and 'sPUSCH', respectively.

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIG. 7, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in (a) of FIG. 7, if two symbols constitute one TTI unit, 6 TTIs may be generated. As illustrated in (b) of FIG. 7, if 3 symbols constitute one TTI unit, 4 TTIs may be generated. As illustrated in (c) of FIG. 7, if 4 symbols constitute one TTI unit, 3 TTIs may be generated. In this case, it is assumed that legacy PDCCHs are transmitted in the first starting two OFDM symbols.

As illustrated in (d) of FIG. 7, in the case in which 7 symbols constitute one TTI, 7 symbols including legacy PDCCHs may constitute one TTI and 7 subsequent symbols may constitute one TTI. If one TTI includes 7 symbols, a UE supporting an sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

Figure 8:
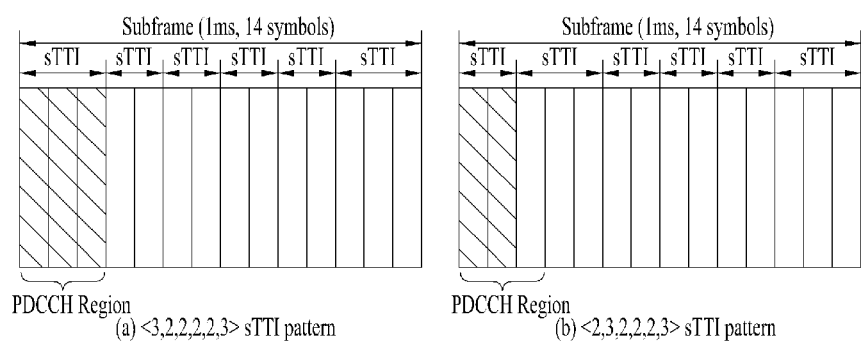
FIG. 8 illustrates the structures of DL subframes including short TTIs of 2 and 3 symbols.

The present disclosure considers a sTTI structure in which a sTTI consisting of two OFDM symbols (OSs) and a sTTI consisting of three OSs coexist in one subframe as illustrated in FIG. 8. The sTTI consisting of two or three OSs may be simply defined as a two-symbol sTTI (or a two-OS sTTI). In addition, a two-symbol sTTI and a three-symbol sTTI may be referred to as a two-symbol TTI and a three-symbol TTI, respectively. It should be noted that each of the sTTIs is shorter than the legacy TTI, i.e., 1 ms TTI. That is, the term "TTI" used herein may indicate the sTTI as well. The object of the present disclosure is to provide a communication method in a system using a TTI shorter than the legacy TTI, irrespective of their names Herein, the numerology may refer to a TTI length or subcarrier spacing to be applied to a wireless communication system, a parameter indicating a fixed TTI length or fixed subcarrier spacing, a communication architecture or system based thereon.

In sTTI pattern <3,2,2,2,2,3> illustrated in FIG. 8 (a), the sPDCCH may be transmitted depending on the number of PDCCH symbols. In sTTI pattern <2,3,2,2,2,3> illustrated in FIG. 8(b), it may be difficult to transmit the sPDCCH due to the legacy PDCCH region.

New Radio Technology (NR)

Hereinabove, the structure, operation or function of the 3GPP LTE (-A) system has been described. The structure, operation, or function of the 3GPP LTE (-A) system may be slightly modified or differently implemented for the NR system. It will be described in brief.

The NR system supports various numerologies. For example, the NR system supports not only a subcarrier spacing of 15 kHz but also a subcarrier spacing that is $2^n$ times higher than the 15 kHz subcarrier spacing (where n=1, 2, 3, or 4).

In the case of a normal CP, the number of OFDM symbols in each slot (hereinafter an OFDM symbol is simply referred to as a symbol) is fixed to 14, but the number of slots in one subframe is supported up to $2^k$ (where k=0, 1, 2, 3, or 4). However, a radio frame is composed of 10 subframes as in the legacy LTE system. In the case of an extended CP, the number of symbols in each slot is fixed to 12, and one subframe is composed of four slots. In addition, one RB is defined as 12 consecutive subcarriers in the frequency domain as in the legacy LTE system.

The usage of each symbol (e.g., DL symbol, UL symbol, or flexible symbol) in one slot may be defined depending on slot formats, and both DL and UL symbols may be configured in one slot. This structure is referred to as a self-contained subframe (or slot) structure.

The next-generation system aims to use wide frequency bands and support various services or requirements. For example, ultra-reliable and low-latency communications (URLLC), which is one of the representative scenarios regarding 3GPP NR requirements, requires low latency and high reliability. Specifically, the URLLC requires that that user plane latency of 0.5 ms is supported and X-byte data is transmitted within 1 ms with an error rate less than 10^-5. Generally, the traffic volume of enhanced mobile broadband (eMBB) is high, but the file size of URLLC traffic is less than tens or hundreds of bytes and sporadically occurs. Thus, for the eMBB, a transmission method capable of maximizing the transfer rate and minimizing the overhead of control information is required, but for the URLLC, a transmission method capable of using a short scheduling time unit and guaranteeing reliability is required.

Depending on application fields or traffic types, various reference time units may be assumed/used to transmit and receive a physical channel. The reference time unit may be a basic unit for scheduling a specific physical channel and vary depending on the number of symbols included in a corresponding scheduling unit and/or subcarrier spacing. In embodiments of the present disclosure, a slot or a mini-slot is used as the reference time unit for convenience of description. The slot may refer to a basic scheduling unit used for normal data traffic (e.g., eMBB). The time duration of the mini-slot may be shorter than that of the slot in the time domain. The mini-slot may refer to a basic scheduling unit used for special traffic or communication (e.g., URLLC, unlicensed band, millimeter wave, etc.). However, this is merely exemplary, and it is apparent that the present disclosure may be extended and applied when a physical channel is transmitted and received based on the mini-slot in the eMBB or when a physical channel is transmitted and received based on the slot in the URLLC or other communication methods.

Channel Selection for URLLC

To increase the reliability of HARQ-ACK feedback, channel selection may be applied in the case of a small HARQ-ACK payload size, for example, one or two bits.

Depending on HARQ-ACK states, resources, information bits, and/or modulated symbols used for PUCCH transmission may vary. For example, (PUCCH resource #1, bit=00) may indicate an ACK, and (PUCCH resource #2, bit=11) may indicate a NACK. In this case, it may be regulated that when the eNB detects a specific combination of a PUCCH resource and a modulated symbol which are not previously mapped together by a higher layer signal or by the eNB, the eNB regard it as a NACK. According to this method, the NACK-to-ACK error rate may be significantly reduced, thereby obtaining gains in terms of latency and reliability.

Information on multiple PUCCH resources used for the same HARQ-ACK transmission may preconfigured or indicated by the higher layer signal or by the eNB. For example, the multiple resources may be linked to a DL control transmission method (i.e., a CCE index), informed by the higher layer signal, and/or indicated by DL control. In particular, specific resources among the multiple resources may be determined from other resources.

For example, the following PUCCH resource and modulation combinations may be defined for the individual states of a 2-bit HARQ-ACK.

(ACK, ACK)=(PUCCH resource #1, bit=00)
(ACK, NACK)=(PUCCH resource #2, bit=01)
(NACK, ACK)=(PUCCH resource #3, bit=11)
(NACK, NACK)=(PUCCH resource #4, bit=10)

As another example, to avoid excessive reservation of PUCCH resources, it may be regulated that resources are shared for some HARQ-ACK states.

(ACK, ACK)=(PUCCH resource #1, bit=00)
(ACK, NACK)=(PUCCH resource #1, bit=01)
(NACK, ACK)=(PUCCH resource #2, bit=11)
(NACK, NACK)=(PUCCH resource #2, bit=10)

Early Termination of Retransmission Using HARQ-ACK

For some packet sizes, the ACK-to-NACK error rate may need to be improved. The ACK-to-NACK error means that when the UE succeeds in decoding a DL signal and transmits ACK information as a HARQ-ACK to the eNB, the eNB erroneously decodes the corresponding HARQ-ACK as a NACK. For example, when a packet is transmitted over multiple PDSCHs, the ACK-to-NACK error may cause unnecessary retransmission, and as a result, resources for new transmission may be wasted. Therefore, if the UE is capable of recognizing the unnecessary retransmission caused by the ACK-to-NACK error, it may be considered that the UE transmits the ACK or information equivalent thereto again to the eNB before a HARQ-ACK timing that is preconfigured or indicated by the eNB after retransmission for a corresponding PDSCH. This method may assist early termination of the retransmission for the corresponding PDSCH. As another method, it may be considered that the UE requests new DL data, that is, transmits a scheduling request.

The information about the early termination (e.g., the scheduling request requesting the ACK or new data or information equivalent thereto) needs to be distinguished from the HARQ-ACK for the PDSCH, which is transmitted on a time/frequency resource expected by the eNB, to achieve the community of interests between the eNB and UE and utilize the information for the early termination. To this end, a transmission timing and/or a transmission (frequency) resource may be determined/configured/indicated independently of the HARQ-ACK for the PDSCH transmitted on the time/frequency resource expected by the eNB.

Specifically, information about early termination of a specific PDSCH may be transmitted after detection of DCI indicating retransmission of the corresponding PDSCH (retransmission DCI for the corresponding PDSCH). Alternatively, the information may be transmitted in a corresponding slot (and more particularly, at the end of the corresponding slot). For example, the transmission timing of the information about the early termination of the specific PDSCH may be a UL slot/mini-slot closest to the time at which the retransmission DCI for the corresponding PDSCH is detected. As another example, the transmission timing of the information about the early termination of the specific PDSCH may be a timing/slot/mini-slot corresponding to a fixed UL resource closest to the time at which the retransmission DCI for the corresponding PDSCH is detected. Alternatively, the transmission timing of the information about the early termination of the specific PDSCH may be configured by the higher layer signal or directly indicated by a physical layer signal (e.g., the retransmission DCI). For example, the transmission timing of the information about the early termination of the specific PDSCH may be a timing/slot/mini-slot after a time offset from the retransmission DCI time, and in this case, the offset value may be included and transmitted in the retransmission DCI.

To distinguish between the HARQ-ACK transmitted on the time/frequency resource expected by the eNB and the ACK for the early termination regarding another PDSCH, the constellation of the ACK for the early termination may be set different from that of the ACK for the HARQ-ACK.

When UCI transmitted on a time/frequency resource expected by the eNB collides with the information about the early termination (e.g., ACK), it may be regulated that simultaneous transmission or transmission of either one of them is allowed. Specifically, when the target BLER and/or BLER requirement for the UCI transmitted on the time/frequency resource expected by the eNB has a lower priority than UCI for the PDSCH to be early terminated, only a channel carrying the information about the early termination may be transmitted. For example, when a HARQ-ACK for an eMBB PDSCH (target BLER=1e-1) collides with an ACK for retransmission (for early termination) of a URLLC PDSCH (target BLER=1e-5), only the ACK for the retransmission (for the early termination) of the URLLC PDSCH may be transmitted.

As another method, when the UCI transmitted on the time/frequency resource expected by the eNB collides with the information about the early termination, multiplexing therebetween may be considered. Specifically, it may be regulated that a different transmission PUCCH format is used depending on whether the UCI collides with the information about the early termination. When the collision occurs, a different resource may be used. More particularly, the both information may be transmitted on a resource configured/indicated for the information about the early termination. When the collision occurs, the duration of a transmission channel of the UCI transmitted on the time/frequency resource expected by the eNB may be changed. Specifically, the duration of the transmission channel of the UCI transmitted on the time/frequency resource expected by the eNB may increase by a predefined amount, an amount configured by the higher layer signal, and/or an amount indicated by the retransmission DCI. In addition, which portion of the channel additional symbols are included in may be configured/indicated. For example, a 4-symbol long PUCCH is collides with the information about the early termination, the symbol duration may increase by a predefined amount, an amount configured by the higher layer signal, and/or an amount indicated by the retransmission DCI so that the both information may be transmitted together on the single long PUCCH. More specifically, the early termination information may be mapped to additional resources. For example, when the 4-symbol long PUCCH becomes a 5-symbol long PUCCH due to the collision and the information about the early termination is transmitted on the corresponding PUCCH, it may be regulated that the information about early termination is mapped to only the one additional symbol.

When PUSCH transmission based on the UCI transmitted on the time/frequency resource expected by the eNB collides with the information about the early termination, the information about the early termination may be piggybacked and transmitted on the PUSCH. Specifically, it may be regulated that the information about the early termination is sequentially mapped from the first symbol of the PUSCH except the DMRS and UCI in the PUSCH. The reason for this is to perform the early termination more rapidly.

CQI Feedback in Case of NACK

When a NACK is transmitted as the HARQ-ACK for a specific transport block (TB), code block (CB), TB group, or CB group, a CQI may be transmitted together to assist the eNB in allocating resources for next scheduling/retransmission. When the UE transmits "NACK+CQI information" on the PUCCH, the payload size may increase compared to when only the NACK information is transmitted. Thus, in this case, a different PUCCH format may be used compared to that when only the NACK information is transmitted. To determine a PUCCH resource to be used for the PUCCH transmission when the UE transmits the NACK+CQI information, the following options are proposed.

Option 1: Assuming that x bits are required to represent the NACK information and y bits are required to represent the CQI information, if the value of x+y causes PUCCH format switching, it may be regulated that the value of y is adjusted such that the PUCCH format switching is not caused. To reduce the value of y, the quantization level of the CQI may be coarse or a CQI subset restriction may be configured. Alternatively, an offset value for the previous CQI may be transmitted to reduce the value of y. As an extreme example, in the case of y=0, it may be considered that only the NACK is transmitted with no CQI.

Option 2: It may be considered that HARQ bundling is performed in the spatial/time/carrier/frequency domain. Specifically, the HARQ-ACK bundling may be performed for each target service, quality of service (QoS), BLER requirement, and/or latency requirement. For example, the bundling may be applied to HARQ-ACKs with the target BLER less than a threshold.

Option 3: CQI information and/or HARQ-ACK information with a low priority may be dropped to prevent the PUSCCH format switching from being caused. For example, it may be regulated that the CQI/HARQ-ACK information for a cell, a CSI process, a channel, and/or a subband/bandwidth part (BWP) having a less strict BLER requirement is dropped first.

Option 4: A different PUCCH resource may be preconfigured for each HARQ-ACK state or configured by the higher layer signal. For example, four NACK resources and four ACK resources may be preconfigured by the higher layer signal, and then a final resource may be determined from among resource indices indicated by a specific field of DCI based on the HARQ-ACK state.

Option 5: A separate PUCCH resource may be preconfigured for the NACK, or the NACK+CQI may be configured and supported by the higher layer signal (as in the channel selection). Specifically, by additionally configuring n resources, a total of (n+1)*2^(number of bits)-1 CQI states or CQI offset states may be represented. For example, when two PUCCH resources are additionally configured and a 1-bit HARQ-ACK is transmitted on each of three resources, a total of 6 states may be represented, and specific states of the NACK+CQI may be mapped to five states except that for the ACK.

Option 6: In a CA environment, if a NACK occurs for at least one carrier, the CQIs for all carriers may be transmitted together. However, this may be inefficient and also degrade the PUCCH performance Thus, it may be regulated that the CQIs for carriers where the NACK occurs are transmitted together. Alternatively, it may be regulated that only in the case of a HARQ-ACK for predefined traffic or traffic corresponding to a specific target service, QoS, BLER requirement, and/or latency requirement among the carriers where the NACK occurs, the CQIs thereof may be transmitted together.

For example, when there are five carriers and {A, N, N, A, N}, only CQI information on the second, third, and fifth carriers may be concatenated and transmitted after the HARQ-ACK.

When the HARQ-ACK payload is less than or equal to 21 bits, if the total number of bits including the CQI exceeds the 21 bits, the format switching may be performed. Alternatively, in this case, some of the CQI information may be dropped in consideration of priorities such that the total number of bits becomes less than the 21 bits. Further, the number of bits representing the CQI information may be reduced, or the HARQ-ACK bundling may be performed.

Option 7: For a specific TB, TB group, CB, CB group, or carrier, the size of a HARQ codebook may be determined as HARQ-ACK bits+CQI (or CQI offset) bits. Specifically, for a TB, TB group, CB, CB group, or carrier where a channel/signal corresponding to a specific target service, QoS, BLER requirement, and/or latency requirement is scheduled to be transmitted, the HARQ codebook size may be determined as HARQ-ACK bits+CQI (or CQI offset) bits.

Option 8: In the case of a one-bit HARQ-ACK, it may be regulated that the HARQ-ACK bit increase to two bits in order to transmit the CQI together. For example, ACK, NACK+CQI #a, NACK+CQI #b, and NACK+CQI #c may be represented using a total of four states.

These options may be used not only for the NACK+CQI but also for normal HARQ-ACK transmission.

It may be regulated that when the UE transmits the HARQ-ACK for a specific TB, TB group, CB, or CB group, the UE determines whether to transmit only a NACK or transmit the NACK together with CQI information differently depending on the target service, QoS, BLER requirement, and/or latency requirement. For example, in the case of an eMBB TB, only the NACK may be transmitted, and in the case of a URLLC TB, the NACK+CQI may be transmitted. As another example, in the case of the HARQ for the PDSCH with a BLER requirement of 10^-1, only the NACK may be transmitted, and in the case of the HARQ for the PDSCH with a BLER requirement of 10^-5, the NACK+CQI may be transmitted.

Alternatively, whether only the NACK or the NACK+CQI is transmitted may be determined based on an RNTI used for scrambling DCI scheduling a specific TB. Further, whether only the NACK or the NACK+CQI is transmitted may be determined based on the format of the DCI scheduling the specific TB.

In the present disclosure, the CQI may be based on a carrier in which a specific TB is transmitted or refer to a CQI calculated from a resource in which the specific TB is scheduled (or a subband corresponding thereto), a resource group including the resource (e.g., a predefined/predetermined or signaled subband(s)), a resource block group (RBG), a precoding resource block group (PRB). Alternatively, a resource for calculating the CQI which is to be transmitted with the NACK may be preconfigured or signaled. Further, the resource may be indicated in the form of a CSI process, and then the CQI for the corresponding CSI process may be calculated.

Since each of the examples of the proposed methods may be included as one method for implementing the present disclosure, it is apparent that each example may be regarded as a proposed method. In addition, although the proposed methods may be implemented independently, some of the proposed methods may be combined (or merged) for implementation. Moreover, it may be regulated that information on whether the proposed methods are applied (or information on rules related to the proposed methods) should be transmitted from the eNB to the UE through a predefined signal (e.g., a physical layer signal, a higher layer signal, etc.).

Figure 9:
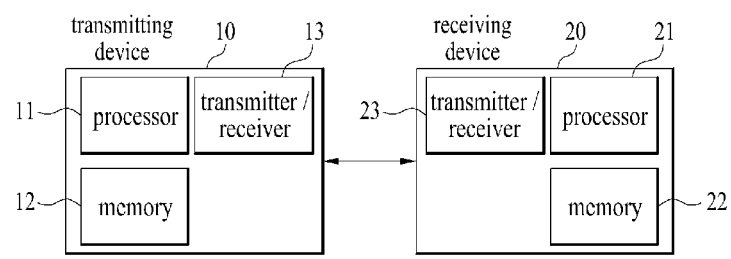
FIG. 9 is a block diagram for a device configured to implement embodiment(s) of the present disclosure.

FIG. 9 is a block diagram of a transmitting device 10 and a receiving device 20 configured to implement exemplary embodiments of the present disclosure. The transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

As a combination of the above-described proposals, provided is a UE for transmitting HARQ-ACK/NACK feedback in a wireless communication system. The UE may include a receiver, a transmitter, and a processor configured to control the receiver and the transmitter. The processor may be configured to: when a NACK needs to be transmitted as HARQ-ACK/NACK feedback for a DL signal, determine a UL resource for transmitting the NACK; determine whether to transmit a CQI, which is related to the DL signal corresponding to the NACK, together with the NACK; and when it is determined that the NACK and the CQI are transmitted together, transmit the NACK and the CQI on the determined UL resource.

Additionally, the UL resource may be determined as a UL resource indicated by a specific field of DCI related to the DL signal among a predetermined number of UL resources.

Additionally, the UL resource may be determined as a UL resource corresponding to the CQI among a preconfigured UL resource for a HARQ-ACK and a predetermined number of UL resources separately configured for the NACK transmission.

Additionally, when multiple DL carriers are configured for the UE and there is a DL carrier for which a NACK needs to be transmitted, the processor may be configured to transmit a CQI for a DL subcarrier corresponding to a predetermined target service, QoS, BLER requirement, and/or latency requirement.

Additionally, whether the CQI related to the DL signal corresponding to the NACK is transmitted together with the NACK may be determined depending on whether the DL signal corresponding to the NACK corresponds to a predetermined target service, QoS, BLER requirement, and/or latency requirement or based on a scrambling identifier or format of DCI scheduling the downlink signal.

Additionally, a HARQ codebook size for the DL signal corresponding to the NACK may be determined as the sum of a bit number for the HARQ-ACK/NACK and a bit number of the CQI.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

The present disclosure may be used for a wireless communication apparatus such as a user equipment (UE), a relay and an eNB.

The invention claimed is:

1. A method for hybrid automatic repeat request-acknowledgment/negative-acknowledgment (HARQ-ACK/NACK) feedback by a user equipment (UE) in a wireless communication system, the method comprising:

determining an uplink resource for transmitting the NACK based on a NACK needing to be transmitted as HARQ-ACK/NACK feedback for a downlink signal;

determining whether to transmit a channel quality indicator (CQI) together with the NACK, wherein the CQI is related to the downlink signal corresponding to the NACK; and transmitting the NACK and the CQI on an uplink resource determined based on the determination that the NACK and the CQI are to be transmitted together, wherein a HARQ codebook size for the downlink signal corresponding to the NACK is determined as a sum of a bit number for the HARQ-ACK/NACK feedback and a bit number of the CQI.

2. The method of claim 1, wherein the uplink resource is determined among a predetermined number of uplink resources, which is indicated by a specific field of downlink control information related to the downlink signal.

3. The method of claim 1, wherein the uplink resource is determined to correspond to the CQI among a preconfigured uplink resource for a HARQ-ACK and a predetermined number of uplink resources separately configured for the NACK transmission.

4. The method of claim 1, further comprising, based on multiple downlink carriers being configured for the UE and there is a downlink carrier for which a NACK needs to be transmitted, transmitting a CQI for a downlink subcarrier corresponding to a predetermined target service, quality of service (QoS), block error rate (BLER) requirement, and/or latency requirement.

5. The method of claim 1, wherein whether the CQI related to the downlink signal corresponding to the NACK is transmitted together with the NACK is determined depending on whether the downlink signal corresponding to the NACK corresponds to a predetermined target service, quality of service (QoS), block error rate (BLER) requirement, and/or latency requirement or based on a scrambling identifier or format of downlink control information scheduling the downlink signal.

6. A user equipment (UE) for transmitting hybrid automatic repeat request-acknowledgment/negative-acknowledgment (HARQ-ACK/NACK) feedback in a wireless communication system, the UE comprising:

a receiver;

a transmitter; and a processor configured to control the receiver and the transmitter, wherein the processor is further configured to:

determine an uplink resource for transmitting the NACK based on a NACK needing to be transmitted as HARQ-ACK/NACK feedback for a downlink signal;

determine whether to transmit a channel quality indicator (CQI) together with the NACK, wherein the CQI is related to the downlink signal corresponding to the NACK; and transmit the NACK and the CQI on an uplink resource determined based on the determination that the NACK and the CQI are transmitted together, wherein a HARQ codebook size for the downlink signal corresponding to the NACK is determined as a sum of a bit number for the HARQ-ACK/NACK feedback and a bit number of the CQI.

7. The UE of claim 6, wherein the uplink resource is determined among a predetermined number of uplink resources, which is indicated by a specific field of downlink control information related to the downlink signal.

8. The UE of claim 6, wherein the uplink resource is determined to correspond to the CQI among a preconfigured uplink resource for a HARQ-ACK and a predetermined number of uplink resources separately configured for the NACK transmission.

9. The UE of claim 6, wherein based on multiple downlink carriers being configured for the UE and there is a downlink carrier for which a NACK needs to be transmitted, the processor is configured to transmit a CQI for a downlink subcarrier corresponding to a predetermined target service, quality of service (QoS), block error rate (BLER) requirement, and/or latency requirement.

10. The UE of claim 6, wherein whether the CQI related to the downlink signal corresponding to the NACK is transmitted together with the NACK is determined depending on whether the downlink signal corresponding to the NACK corresponds to a predetermined target service, quality of service (QoS), block error rate (BLER) requirement, and/or latency requirement or based on a scrambling identifier or format of downlink control information scheduling the downlink signal.

* * * * *